3,442,668
METHOD OF MANUFACTURING CERAMICS
Michael J. Fenerty, Flint, and Arthur V. Somers, Flushing, Mich., assignors to General Motors Corporation, Detroit, Mich., a corporation of Delaware
No Drawing. Filed Aug. 16, 1965, Ser. No. 480,108
Int. Cl. C04b 33/32, 33/02
U.S. Cl. 106—39          15 Claims

ABSTRACT OF THE DISCLOSURE

A process for manufacturing ceramics is disclosed. The process consists of the steps of dry grinding in a ball mill a particulate ceramic batch in admixture with a small, but effective amount of organic material having sufficient deflocculant ability to prevent packing in the ball mill and sufficient binding ability to afford green strength for a compacted ceramic article. The dry milled material thus obtained is mixed with water and subsequently spray dried. The ceramic particulate is then compacted and sintered to yield the desired article.

---

This invention relates to ceramics and to an improved method for their manufacture. The invention has particular utility for the manufacture of industrial ceramics, electrical insulators and the like such as are made of high alumina composition but is also useful for the manufacture of china, tile, and other porcelain or high clay content ceramic bodies.

At the present state of the art there are principally four methods used for the manufacture of ceramic articles. The oldest of these methods includes the steps of wet grinding a ceramic raw batch (that is, grinding with a substantial amount of water present such that the batch is in the form of a slurry) filtering, aging the filtering cake until it has the right plasticity, forming into the desired shapes and then drying and firing. This method which requires that the batch contain clay or a like plastic ingredient is used widely for the manufacture of various types of whiteware, tile and the like, and is also still used to some extent for the manufacture of spark plug insulators and other high alumina industrial ceramics. However, for the latter types of products, the more widely used method during recent years has been the so-called spray drying and isostatic molding process. With this process the raw batch is either wet ground or is dry ground (that is, grinding substantially dry or with not more than 1% uncombined water present or less than 6% organic material such that the batch is in a loose, pulverant state) after which it is mixed with a wax-water emulsion in a blunging operation to form a slurry. Next, the slurry is screened and then sprayed in small droplet forms into a hot, air drying tower to evaporate the water and provide a flowable mass of small globules of wax bonded ceramic. This material is then isostatically molded in the rubber molds by the application of fluid pressure to form the desired shape after which the shaped pieces are fired to burn out the wax and sinter or vitrify the ceramic. This method, which is disclosed in U.S. Patent 2,251,454, has the advantage that it does not rely on plasticity in the ceramic body composition for purposes of shaping the article. Hence, it can be used to produce high alumina or other pure oxide or mix oxide bodies which contain little or no clay. The third commonly used method involves the steps of grinding the raw ceramic batch, uniformly admixing with the ground batch a thermal plastic organic resin, injection molding the articles and then firing to burn out the resin and sinter the ceramic. The success of this process is largely dependent on obtaining a uniform mixture of the resin with the ceramic and in obtaining a uniform density in the molded prefired article.

The fourth method involves the steps of grinding the raw ceramic batch in admixture with an organic material which provides sufficient deflocculating property to prevent packing in the ball mill and sufficient binder property for molding the powder into an article of the desired shape. This method involves a single step and does not require the addition of any water.

It will be noted that three of the above outlined methods consist of at least four steps, at least one of which steps has no other function than to enable the forming of the ground ceramic into a self-sustaining prefired article of relative uniform density. Uniform density is important because if there should be non-uniformity by reason of their inclusions, non-uniform compaction or the like, there is considerable distortion of the ware during firing as well as inferior properties, mechanical strength and electrical resistance of the finished product.

The present invention has as its principal object the provision of an improved method for the manufacture of ceramics. More specifically, it is an object of this invention to provide a method for forming a loose, pulverant ceramic material having high green strength and free-flowing characteristics. It is another object of this invention to provide a method for forming a loose, pulverant ceramic material which will form a prefire compact that is easily ground into the desired shape.

The essential steps in the process of this invention are those of dry grinding, wetting and drying, shaping and firing. However, the key to this invention is in the combination of the dry grinding step with the subsequent wetting and spray drying steps. Briefly, the essential details of this combination are: (1) That the operation of grinding be done under dry conditions, that is, essentially water free, in the presence of an organic material providing sufficient deflocculating ability to prevent packing in the ball mill and sufficient binder property to permit forming of a compact; (2) that the ground ceramic material be mixed with water; and (3) that the aqueous ceramic mixture thus formed be spray dried. The combination of steps described above yields a ceramic powder having superior flow charcteristics and which will form a compact having high strength and excellent grindability characteristics. This powder is then pressed or isostatically molded to prefired shapes of extremely uniform density. There remains then only the firing step to sinter or vitrify the shaped articles to the ceramic end product.

The above and other features and advantages of the invention will appear more clearly from the following detailed discussion of particulars and of preferred embodiments.

CERAMIC RAW MATERIAL FOR THE GRINDING OPERATION

The ceramic material selected for the raw batch will, of course, depend upon the type of ceramic ware desired. For high strength industrial ceramics or electrical insulators it can, for example, be a single oxide such as aluminum oxide or beryllium oxide, a mixture of such oxides, for example aluminum oxide and magnesium oxide, or a mixture of such oxides together with small amounts of fluxing ingredients or mineralizers such as talc, calcium carbonate, clay and the like. For such items as tile and dinnerware the ceramic raw batch can likewise be of any of the various compositions presently used.

The method of this invention is particularly useful for the manufacture of extremely high quality ceramics, especially for industrial uses, where the raw batch is substantially free of all glass-forming ingredients such as clay or other siliceous materials. Typical examples of such a batch are: 100% aluminum oxide; 100% beryllium oxide;

99.75% aluminum oxide and 0.25% magnesium oxide (added as such or as magnesium sulfate or magnesium nitrate); 99.25% aluminum oxide, 0.25% magnesium oxide (added as such or as magnesium sulfate or magnesium nitrate) and 0.5% chromium oxide.

Where alluminum oxide is the principal ingredient in the raw batch, as is desirable where the method is used to produce high strength industrial ceramics or spark plug or other electrical insulators, it is preferred that the aluminum oxide be a substantially soda-free and silica-free calcined alumina of small crystal size. Such aluminas are common in the market.

NONCERAMIC RAW BATCH INGREDIENTS

In addition to the ceramic materials, the raw batch for the grinding operation must also include a small amount, up to about 6% by weight, of an organic material which functions both as a deflocculating agent and as a binder. By the term "deflocculating agent," we mean an organic material which serves as a non-agglomerator and lubricant and which therefore inhibits any sticking of the grains to the other during grinding thereby preventing any packing in the grinding mill and providing the batch with a flowability comparable to that of a liquid both during the grinding operation and during the subsequent pressing operation. By the term "binder," we mean an organic material which provides the prefired articles resulting from the pressing or molding operation with sufficient mechanical strength to withstand a considerable amount of shock during handling operations between forming and firing. The organic material may be a single substance having both defloculant and binder properties or it may be a combination of two chemicals in which one chemical is primarily a deflocculant and the other adds binder properties. Eminently satisfactory deflocculating agents are the ligno sulfonates, for example sodium ligno sulfonate and ammonium ligno sulfonate, the sodium salts of the alkyl areal polyether sulfates, and the sodium salts of the alkyl areal sulfonic acids. Other organic deflocculating agents desirable for the practice of the invention are: the salts and esters of the organic fatty acids, for example hydrogenated castor oil or cottonseed oil, diglycol monolaurate, diglycol dilaurate, polyethylene glycol monolaurate, aluminum stearate, aluminum hydroxy stearate; ethylene or propylene glycol and the low molecular weight polymers thereof, for example, polyethylene glycol mol. wt. 400. Also suitable though not as good are dextrin and triethanolamine. Combinations of two or more deflocculating agents may be used to advantage. For example, we have found the combination of sodium ligno sulfonate and hydrogenated cottonseed oil or hydrogenated castor oil to be excellent.

Some of the deflocculating agents mentioned above provide both sufficient deflocculating ability and binding ability; however, with some of the deflocculants it is necessary to add a separate chemical in order to supply sufficient binding ability to the mixture. Where a separate binder is added it is mixed with the raw batch during the grinding operation. Dry powdered paraffin wax is eminently suitable as a binder material. It should be noted that whereas many of the deflocculating agents by themselves will not have sufficient properties as a binder during the pressing operation to produce the green strength desired in the pressed articles, nevertheless the deflocculating agent will not prevent added binder material from functioning as such during pressing. Hence, there is no need to remove the deflocculating agent prior to pressing in order to attain excellent green strength.

To attain minimum shrinkage during firing and also for reasons of economy it is, of course, desirable to use as little organic material in the batch as is necessary to accomplish the desired batch properties. Hence, whereas larger amounts of deflocculating agent and binder can be included in the batch, it is preferred that the total percentage of organic material, including both deflocculating agent and binder, not exceed about 6%. Generally about 2% by weight deflocculating agent is ample to provide the anti-agglomerating and flowability properties required and about 2% by weight binder is sufficient for excellent green strength.

THE GRINDING OPERATION

The grinding operation can be performed in a conventional ball mill preferably either rubber lined or lined with a ceramic material having a composition similar to that being manufactured in order to avoid adverse contamination. In this same vein, it is preferred that the mill balls be of a dense ceramic having a composition the same or similar to the ceramic being manufactured. Mill balls, having an initial diameter of about one to four inches, are quite satisfactory for milling production size batches. There is, of course, mill ball wear during the grinding though we have found that the amount of wear is considerably less in the practice of the present invention than in conventional wet milling operations.

The ceramic ingredients in the desired proportions along with the deflocculating agent and preferably also an organic binder are placed in the mill along with the conventional number of mill balls (approximately four or five pounds of mill balls for every pound of ceramic batch when working with alumina) and the batch is then dry ground until mixing is completed and the desired extent of particle size reduction is accomplished. A grinding time of four to five hours is generally sufficient for compositions containing up to about 95% alumina together with siliceous or other glass forming materials. For higher alumina bodies containing little or no glass forming constituents, grinding times of 10 to 30 hours are desirable. After grinding, the loose, flowable, ground batch can be immediately passed to the pressing or molding operation to produce shaped, self-sustaining prefired articles. The deflocculating agent along with the binder, if one is used, appears in the ground batch as an extremely thin coating on the ceramic particles.

While a conventional mill ball-to-batch weight ratio of 4 or 5 to 1 is satisfactory to provide good quality ceramic ware, an outstanding product improvement can be accomplished, particularly in the case of bodies containing little or no glass forming ingredients, by increasing the ratio to about 10 to 1 and preferably 20 to 1 as covered by copending United States Ser. No. 253,255, filed on Jan. 23, 1963. Using such a ratio, extremely high compaction densities are attainable in the prefired articles and this in turn results in high density fired ware with relatively little shrinkage during the firing operation.

WETTING AND SPRAY DRYING OPERATION

The dry milled ceramic particulate is then placed into a blunger and mixed with water to make a slip having a consistency of approximately 65 to 70% ceramic particulate and 30 to 35% water. The mixture is stirred until a homogeneous slip is obtained. It has been observed that the fluid must contain at least 25% water in the case of alumina to obtain a fluid mixture which is pumpable. In the case of other ceramics having a greater density the minimum amount of water required could be as low as 20%. The maximum amount of water is 60%. Usually a minimum amount of water is added to form the slip in order to reduce the cost of the gas used in the drying operation to evaporate the water. In the case of alumina 30 to 35% water is the preferred water concentration. The slip is then pumped to a conventional spray dryer and dried. The spray dryer consists of a large cone-shaped or funnel-shaped metal vessel positioned so that the narrow portion is on the bottom and the wide portion on top. The slip is pumped to the top of the dryer and atomized by means of a spinning bowl arrangement to droplets which are sprayed toward the walls of the dryer. The air in the dryer is circulated in the dryer at an elevated temperature above 220° F. This hot air causes the water in the droplets to evaporate immediately and the remaining dry powder hits the side of the vessel and drops downward into a waiting container. As soon as the ceramic particulate has cooled off, it is ready for the forming operation. Therefore, spray drying is defined by the steps of atomizing a ceramic slip containing 20 to 60% water into fine droplets and passing heated air through the fine droplets to evaporate the water to yield a free-flowing powder.

FORMING OPERATION

The desired prefired articles are pressed from the particulate material from the spray drying operation preferably by pressing in matched metal dies or by isostatically molding with rubber molds substantially the same as those used in the so-called spray drying-isostatic molding process as previously outlined. Because of the fluid nature of the particulate material from the spray drying operation, it fills the die or mold easily, much as would a liquid, and on the application of pressure extremely uniform density can be accomplished in the prefired article. Pressures on the order of 2000 to 7000 pounds per square inch are quite satisfactory to produce the desired results. Even though the ceramic batch material prior to pressing has a high degree of fluidity due to the presence of the deflocculating agent, the prefired articles resulting from the forming operation are self-sustaining and have ample green strength to withstand all the normal handling operations between forming and firing. As indicated previously, a binder preferably powdered dry paraffin wax should be included in the batch if the deflocculating agent does not provide the amount of green strength desired in the prefired articles.

For the manufacture of ceramic articles of relatively simple shape such as cylinders or discs, the use of matched steel dies serves eminently well and is recommended for the forming operation. However, where the shapes desired are relatively complex, for example, spark plug insulators, the use of rubber molds is much preferred.

In addition to providing an extremely uniform density in the prefired articles, the process of this invention is advantageous in that extremely good compaction can be attained. This is presumably because of the lubricity of the material which allows one grain to slide with respect to the others during the application of pressure thereby resulting in prefired articles of relatively high density. Also, there is evidence that the presence of the deflocculating agent during milling effects the particle size and particle size distribution attained such that the ground material is susceptible to high compaction values. As indicated previously, exceptionally high prefired densities can be accomplished by utilizing the grinding technique as covered by copending United States patent application Ser. No. 253,255, now U.S. Patent No. 3,238,048, wherein a large ratio of mill balls-to-charge is used in the grinding operation.

FIRING OPERATION

The firing temperature and schedule used to fire the articles from the forming operation to cause sintering will, of course, depend on the ceramic ingredients used. For any type of ceramic body made by the process of this invention the firing temperature, time and other conditions can be the same as those utilized in firing the same type of ceramic processed by conventional techniques. For example, for alumina bodies containing 90% aluminum oxide, firing temperatures of about 2700° F. to 3100° F. on a six hour schedule are usual, all as will be evident from the following example.

Example 1

A ceramic raw batch was formed by adding to a conventional ball mill calcined alumina oxide 90% (by weight), 4.7% kaolin, 1.3% strontium carbonate, and 4% talc. Then 1% sodium ligno sulfonate and 2% dry powdered paraffin wax were added additionally to the mill. The mixture was dry milled for 5 hours using alumina grinding balls in a ratio of 5 pounds of balls to each pound of batch. At the conclusion of this grinding operation, the fluid ceramic batch was mixed with water in a plunger to form a slip containing 70% ceramic particulate. The slip was pumped to the spray dryer and dried accordingly. The ceramic batch obtained from the spray drying step was pressed in matched steel dies with a pressure of 2,000 pounds per square inch to form a self-sustaining cylindrical-shaped compact. These cylinders were then fired in ordinary non-reducing atmosphere to 3050° F. on a normal 6 hour schedule (with a 1 hour hold at maximum temperature) during which time the organic material was burned out and the ceramic sintered to a dense, nonporous body.

The ceramic powder obtained by the process of this invention described in Example 1 wherein the ceramic powder was dry milled in the presence of a material having deflocculant and binder properties and thereafter followed by a wetting and spray drying step has very desirable properties. The process of this invention will be referred to below as the "semi-dry" process. Properties of the ceramic powder obtained by the "semi-dry" process were compared with those of the ceramic powder obtained by a "dry" process; that is, where there was no wetting and no spray drying step as well as with those of the ceramic powder obtained by "wet" process in which the raw batch was dry-milled in the presence of a deflocculating agent and where the wax binder was added during the wetting step and which was subsequently followed by the spray drying. The ceramic powders obtained by all three processes contain the same ceramic composition as described in Example 1, including the 1% sodium ligno sulfonate and the 2% wax binder. In all three processes, the ceramic mixture was dry milled in the presence of the sodium ligno sulfonate. In the "semi-dry" process of this invention and in the "dry" milling process 2% wax binder was also present during the milling step. The wetting step and the spray drying step were utilized in the "semi-dry" and in the "wet" process with the wax binder being added during the wetting step in the "wet" process.

The following table shows data comparing the flow rate of the ceramic powder formed by the three processes, the green strength of insulators formed by pressing the ceramic powders in a mold at 2000 p.s.i. and the time required to grind insulators that have been formed in a mold at 4000 p.s.i.

| Property | Process | | |
| --- | --- | --- | --- |
| | Semi-dry | Wet | Dry |
| Flow rate, sec./gm | 1.57 | 1.30 | |
| Green insulator strength,[1] gms | 1,757 | [2] 0 | 1,920 |
| Grindability time,[3] seconds | 13.3 | 21.1 | 14.3 |

[1] Insulator blank formed with 2,000 p.s.i.
[2] Insulator blank could not be pressed without breaking.
[3] Insulator blank formed with 4,000 p.s.i.

The flow rate of each material was determined with a Hall flowmeter and a stop watch. The flow rate of each material was calculated by measuring the time it took to flow through the flowmeter and fill a 100 cc. volumetric flask to the designated mark and dividing this time by the weight of the powder. The flow rate determined by this method was reported in grams/second. As can readily be seen from the table, the flow rates for the semi-dry process material described in this invention and the wet process material were of the same order of magnitude; however, the dry process material failed to flow through the flowmeter thereby giving an indication that its flow characteristics were inferior to the other two methods.

Automotive-type spark plug insulator blanks were formed in a standard rubber mold press under a presure of 2000 p.s.i. As shown in the table, the wet process material did not have sufficient green strength to permit an insulator blank to be forced at this pressure without breaking. This would indicate that the low green strength of the wet process material would require a higher pressure, for example 4000 p.s.i., to be used in the rubber mold press in order to form the green insulator blanks. The green strength of the insulators that were formed with the semi-dry process and the dry process material was found to be of the same order of magnitude. The green strength was determined by adding weight to a bearing edge at the midpoint of the barrel of the insulator at a rate of 1800 grams per minute until the insulator breaks.

The grindability characteristics were determined by measuring the time required to grind an insulator blank a given distance. The shorter the grindability time, the more desirable it is. The grinding time for the semi-dry process ceramic material was less than that of the wet process material thereby indicating that the semi-dry process material had better grindability characteristics than the wet process material.

As has been pointed out above, the semi-dry process material of this invention was the only material which had desirable green strength, grindability, and flow characteristics. In contrast, the wet process material had poor green strength and grindability characteristics and the dry process material had poor flow characteristics.

While the process of this invention involves certain specified steps in proceeding from the initial raw ceramic materials to the fired articles, it will be understood that additional steps may be included if desired. For example, subsequent to the pressing operation and prior to firing it may be desirable to use a form grinding or shaping step to remove portions of the pressed articles particularly where the bodies to be manufactured are of complicated shape. Hence, while the invention has been described in detail with reference to certain embodiments thereof, changes may be made, all within the full and intended scope of the claims which follow.

What is claimed is:

1. In a process for manufacturing ceramics, the steps of dry grinding in a ball mill a particulate ceramic batch in admixture with a small but effective amount of an organic material having deflocculant and binder properties, said material having sufficient deflocculating ability to prevent packing in the ball mill and sufficient binding ability to afford green strength for a compacted ceramic article, mixing the ceramic obtained by the dry grinding step with water, and spray drying the water-ceramic mixture to produce a free flowing, finely divided ceramic powder.

2. A process as set forth in claim 1 wherein the amount of material ranges from a small but effective amount up to 6.0 weight percent.

3. A process according to claim 1 in which said material consists essentially of a mixture of paraffin wax and a quantity of an organic compound having sufficient deflocculating ability to prevent packing in the ball mill.

4. A process according to claim 1 in which said water-ceramic mixture contains 20 to 60% water.

5. In a process for manufacturing ceramics, the steps of dry grinding in a ball mill a particulate ceramic batch in admixture with a small but effective amount of an organic material having deflocculant and binder properties, said material having sufficient deflocculating ability to prevent packing in the ball mill and sufficient binding ability to afford green strength for a compacted ceramic article, mixing the ceramic obtained by the dry grinding step with water, and spray drying the water-ceramic mixture to produce a free flowing, finely divided ceramic powder, subsequently pressing the ceramic particles from said grinding step to form a compacted article of uniform density having good grindability characteristics, and then firing said articles to form a dense, nonporous, sintered ceramic body.

6. A process set forth in claim 5 wherein the amount of material is from a small but effective amount up to 6.0 by weight percent.

7. A process according to claim 5 in which said material consists essentially of a mixture of paraffin wax and a quantity of an organic compound having sufficient deflocculating ability to prevent packing in the ball mill.

8. A process according to claim 5 wherein said ceramic mixture contains 20 to 60% water.

9. In a process for manufacturing ceramics, the steps of dry grinding in a ball mill, a particulate ceramic batch in admixture with a small but effective amount of an organic material having deflocculant and binder properties, said material having sufficient deflocculating ability to prevent packing in the ball mill and sufficient binding ability to afford green strength for a compacted ceramic article, said material contains a quantity of ligno sulfonates having sufficient deflocculating ability to prevent packing in the ball mill, mixing the ceramic obtained by the dry grinding step with water, and spray drying the water-ceramic mixture to produce a free flowing, finely divided powder, subsequently pressing the ceramic particles from said grinding step to form a compacted article of uniform density having good grindability characteristics, and then firing said article to form a dense, nonporous, sintered ceramic body.

10. A process according to claim 9 wherein said material is sodium ligno sulfonate.

11. A process according to claim 9 wherein said material is ammonium ligno sulfonate.

12. A process according to claim 9 wherein said water-ceramic mixture contains 20 to 60% water.

13. A process according to claim 9 in which said material contains paraffin wax.

14. In a process for manufacturing ground ceramic particles suitable for compacting and sintering, the step of dry grinding in a ball mill a particulate ceramic batch in admixture with a small but effective amount of an organic material having deflocculant and binder properties, said material having sufficient deflocculating ability to prevent packing in the ball mill and sufficient binding ability to afford green strength for a compacted ceramic article, mixing the ceramic obtained by the dry grinding step with water, and spray drying the water-ceramic mixture to produce a free flowing, finely divided ceramic powder.

15. A product obtained by the process described in claim 1.

References Cited
UNITED STATES PATENTS

| | | | |
|---|---|---|---|
| 2,251,454 | 8/1941 | Jeffery | 264—56 |
| 3,252,809 | 5/1966 | Somers | 106—65 |

JAMES E. POER, *Primary Examiner.*

U.S. Cl. X.R.

106—46, 62, 65